(12) United States Patent
Streichsbier et al.

(10) Patent No.: US 7,371,266 B2
(45) Date of Patent: *May 13, 2008

(54) APPARATUS FOR CLEANING A DIESEL PARTICULATE FILTER WITH MULTIPLE FILTRATION STAGES

(76) Inventors: Michael Streichsbier, 1757 Walnut St., El Cerrito, CA (US) 94530; Richard G. Lemke, 4336 Jellet St., San Diego, CA (US) 92110; Dean Wehrley, 7210 Columbine Dr., Carlsbad, CA (US) 92009; Bradley L. Edgar, 123 Ironwood St., Oakland, CA (US) 94605; Marc D. Rumminger, 2742 Fulton St., Berkeley, CA (US) 94705

( * ) Notice: Subject to any disclaimer, the term of this patent is extended or adjusted under 35 U.S.C. 154(b) by 0 days.

This patent is subject to a terminal disclaimer.

(21) Appl. No.: 11/402,303

(22) Filed: Apr. 10, 2006

(65) Prior Publication Data

US 2006/0248864 A1 Nov. 9, 2006

Related U.S. Application Data

(63) Continuation of application No. 10/648,137, filed on Aug. 25, 2003, now Pat. No. 7,025,811.

(60) Provisional application No. 60/405,437, filed on Aug. 23, 2002.

(51) Int. Cl.
*B01D 29/68* (2006.01)

(52) U.S. Cl. ............ 55/283; 55/294; 55/302; 55/315; 55/467; 55/482; 95/279; 95/281; 95/283; 96/417; 96/421; 210/411; 210/413

(58) Field of Classification Search ............ 55/282.2, 55/283, 294, 302, 315, 467, 482; 95/279, 95/281, 283; 96/417, 421; 210/411, 413
See application file for complete search history.

(56) References Cited

U.S. PATENT DOCUMENTS

| 4,614,581 | A | * | 9/1986 | Drori | 210/108 |
| 5,421,845 | A | * | 6/1995 | Gregg et al. | 55/294 |
| 5,514,270 | A | * | 5/1996 | Barzuza | 210/356 |

* cited by examiner

*Primary Examiner*—Duane Smith
*Assistant Examiner*—Minh-Chau T. Pham
(74) *Attorney, Agent, or Firm*—Brooks Kushman P.C.

(57) ABSTRACT

The present invention is directed to a filter cleaning device, in particular, diesel particulate filters. In one embodiment, the device includes a source of high pressure fluid and a mechanism transport the fluid to a nozzle or nozzles; an actuator for moving the nozzles; a controller with logic for instructing the actuator to automatically move the nozzle or nozzles across the surface of the filter; a collection device and suction device downstream of the filter; and ducting to transport the fluid between parts of the system. In one embodiment, a second collection device is used downstream of the suction device to provide additional particulate removal. There are three methods proposed for providing high pressure cleaning fluid to the filter face: 1) rotating the filter and rotating the jet about an axis outside of the filter; 2) moving a nozzle in two perpendicular directions (i.e., x-y); and 3) rotating a radial nozzle about the central axis of the filter.

20 Claims, 9 Drawing Sheets

APPARATUS FOR CLEANING A DIESEL PARTICULATE FILTER WITH MULTIPLE FILTRATION STAGES

RELATED APPLICATIONS

This application claims the benefit of priority from commonly assigned, co-pending U.S. Provisional patent application Ser. No. 60/405,437 filed Aug. 23, 2002, and is a Continuation of patent application Ser. No. 10/648,137 filed on Aug. 25, 2003, now U.S. Pat. No. 7,025,811.

BACKGROUND OF THE INVENTION a) Field of the Invention

This application is directed to a device for cleaning filters, and in particular, diesel particulate filters.

b) Description of Related Art

A diesel particulate filter removes organic and inorganic particulate matter (PM) from the exhaust gas stream of an engine. The organic particulate is a complex blend of carbon, hydrogen and oxygen, and is a result of incomplete combustion of the diesel fuel in the cylinder. The inorganic portion of the PM has its source in the additives in the lubrication oil or fuel, and material eroded from the engine surfaces. Under optimal circumstances, the organic PM will fully combust during filter regeneration and thus leave the filter as gaseous $CO_2$ and $H_2O$. The inorganic component, on the other hand, can not be converted to gaseous components, and is trapped in the filter as various oxides (called "ash"). To maintain acceptable performance, the ash must be periodically removed from the filter.

Some installations of diesel particulate filters (DPFs) are made on engines which have operating temperatures too low to properly regenerate the filter (i.e., oxidize the organic PM). In these cases, the filter can become clogged with PM and potentially reduces the performance of the engine. In addition, a filter with a high soot load has a higher chance of permanent damage through uncontrolled regeneration than one with low soot load. In these cases of insufficiently high operating temperature, regular removal of the soot may be required.

Prior approaches to filter cleaning, as discussed in this section, have various flaws and shortcomings. Some of these approaches are overly complex, others are ineffective at removing tightly bound particulate, and others can lead to high PM emissions during the cleaning process.

The following illustrates the prior approaches (e.g., devices and methods) and their disadvantages.

I. Cleaning the DPF while it is off the engine

A simple way to clean a filter is with a compressed air hose. The hose is directed into the exit face of the filter, thus blowing the soot out of the wall in the reverse direction to which it was initially deposited (i.e., backwashing or back flushing). This method is imprecise, potentially dangerous (compressed air hazards), requires the full attention of an operator, and if improperly performed can lead to emission of PM from the filter end as well as a poorly cleaned filter.

Heating the dirty filter in an oven to a high temperature can effectively remove the carbon-based particles, but requires significant energy input and does not remove the inorganic ash. After a heating cycle, the cool down period is significant, and the ash must be removed through vacuuming or washing.

A large blower can be used with the filter in the reverse flow orientation. Blowers of the appropriate size are expensive and noisy, and the technique may not remove the tightly bound material. Additionally, as the cleaning process progresses, the flow will preferentially go through the cleanest portion (i.e., areas with least pressure drop).

The ECS Unikat Combifilter (Engine Control Systems Europe AB, 2001) is a particulate filter and regeneration system which is designed to be installed on a vehicle or stationary engine. The first section of the device (the "regeneration section") is an electrical heater which is used to regenerate the particulate filter (using electricity from the utility grid). With a change in flange configuration and removal of the filter section, the heater could be used as an off-engine regeneration device. When soot removal is required, the filter is removed from the vehicle and installed downstream of the Unikat Combifilter regeneration section. The device is started, and after the 2 to 8 hour regeneration period, the carbonaceous soot will be removed, but the ash remains within the filter.

The CombiClean system is also available from ECS, consists of the electrical regeneration device described above, a compressed air hose and nozzle, and an ash collection vacuum (ECS CombiClean brochure, #M21-0024-December 2002). The system relies on manual application of compressed air to loosen the ash before the vacuuming process.

Many systems for cleaning industrial devices utilize a combination of liquid flow and ultrasound, which may be effective, but can be overly expensive In addition, the cleaning liquid can damage the catalytic coating or the matting material which secures the catalyst within its metal housing.

Others have described cleaning systems which involve backwashing with "cleaning fluid" until the filter is clean. However, many catalysts and their matting material are sensitive to large amounts of water or solvents. Solvents have the additional disadvantage of requiring disposal. In addition, the flow of cleaning fluid might not be controlled locally (i.e., a single fluid stream flows over the unit), so that some sections of the filter might not be cleaned as well as others.

Vacuuming methods are used in the catalyst industry to remove excess washcoat or to remove ash from a flow-through monolith. The vacuum technique has the same disadvantages as the blower method.

II. Cleaning the DPF while it is on the Engine

Methods for collecting particulate using several particulate filters with valves to control the flow path are described in a number of patent documents. A combination of valve settings can start the back-flush of one of the filters (i.e., the direction of gas flow is reversed and flows to push the soot out of the filter).

Shimoda et al. discloses a method which 'backwashes' a DPF to remove the particulate and ash collected in the filter. The backwashing occurs while the device is on the vehicle, and an impact air valve is used to provide a pressure wave to dislodge the particulate matter.

The above "back-flush" methods have the disadvantage that the ash from the lubricating oil never leaves the filter system (what is back-flushed from one element flows into another element), and manual cleaning will still be required.

Another system to clean the filter while it is on the engine is from Peugeot. The catalyst/filter system has a built-in ash/additive collection receptacle below the filter which allows the debris shaken loose by engine vibration to collect for later disposal. A method for washing with an air or water blower (while the engine is not running) is also disclosed.

The RC-2 Cleaning system (Environmental Solutions Worldwide Inc., Model RC-2 Cleaning System) is a device which can be attached to the inlet of the catalytic unit while it is on the vehicle, thus removing the need to wait for the device to cool to handling temperature. It is designed for flow through catalysts, which are relatively easy to clean, and thus does not provide a localized high pressure flow at the face of the catalyst.

Reversing the filter on the vehicle so that the exhaust gas passes from the clean side of the filter to the dirty side (thus expelling the particulate) can lead to a cleaner filter, but results in an unacceptable quantity of toxic particulate entering the air. In confined work areas such as maintenance garages, the likelihood of exposure to the particulate is high.

III. Rotating Arms

Wade describes a device for regenerating a particulate trap using a rotating electrical heating element. A portion of the exhaust gas bleeds through the rotating arm and flows over the heating element. The combination of low flow rate and high temperature improves the chance of regeneration.

Williams discloses a dust collector with on-board programmable cleaning control. A rotating arm with a plurality of nozzles mounted upon it provides the back-flushing flow, thus causing the particulate to be removed from the bag surface and settle into a collection chamber. The control system operates the arm and nozzles to produce jets of cleaning fluid above the various bag units. The arm also contains a sensor for determining the dirtiness of each filter element (a pitot tube is suggested). The system described in the patent has several design elements which make it unsuitable for use in diesel particulate filter applications. First, DPFs are much smaller than dust collectors, and the nozzle designs in the above dust collector are specialized for large filters. A typical DPF is between 15 cm and 32 cm in diameter. The dust collector shown in the patent appears to be many meters in diameter. Second, DPFs can have many thousand cells, and thus focusing air on each individual cell is impractical. Other similar designs for dust collectors have the same shortcomings.

SUMMARY OF THE INVENTION

The present invention provides solutions for at least some of the drawbacks discussed above. Specifically, some embodiments of the present invention provide a filter cleaning device providing an automatic movement of the cleaning device. As the number of particulate filters on vehicles grows, the need for an automatic system is apparent. The device should be automatic, it should remove both soot and ash, and it should not damage the catalytic coating. It may be configured to work with a typical DPF which may be between about 15 cm and 32 cm in diameter. At least some of these and other objectives described herein will be met by embodiments of the present invention.

In one embodiment, the present cleaning device comprises a cleaning fluid delivery device which may include a nozzle and tubing; automatic means to move and control the cleaning fluid delivery device; means to mount the inlet and outlet sections to the filter; a device which creates a vacuum; and one or more dust filters. To further improve the performance, the device may further optionally comprise the means to sense the flow rate of compressed air, a blower, and a valve to switch the flow between vacuum and blower.

Although not limited to the following, there are three methods proposed for providing high pressure cleaning fluid to different regions of the filter face: 1) rotating the filter and rotating the jet about an axis outside of the filter; 2) moving a nozzle in two perpendicular directions (i.e., x-y); and 3) rotating a rectangular nozzle about the central axis of the filter.

In one embodiment, the basic components are similar for all three methods of fluid delivery. The components may include a flexible duct connected to a source of high pressure fluid (air or other cleaning fluid such as but not limited to water, alcohol, acetone when appropriate). In such an embodiment, the fluid is transferred through an arm which is attached to means for translation, eventually exiting the duct at a nozzle. A controller moves the nozzle to provide a relatively uniform level of cleaning for all parts of the filter. The base of the filter is attached to ducting which carries the cleaning fluid and material released from the DPF through a filtering device, a suction device, and optionally a second filtering device.

The design of the collection system that may be used downstream of the DPF may use special filtering techniques. Widely available HEPA filters are rated to trap 99.97% of airborne particles 300 nanometers and larger. The next, and far more expensive, grade is the ULPA filter (Ultra-Low Penetration Air). This class of filters traps finer particles: 99.99% of particles 120 nanometers and larger. Diesel particulate matter, however, may be composed of particles which are smaller than the lower bounds of these filters, and it is unclear whether particle agglomeration or filtering by the layer of PM within a HEPA or ULPA filter will provide sufficient removal of the finest particles. In one embodiment, a novel improvement to the design is to locate a wall-flow DPF in the exhaust stack of the vacuum system, which will be capable of removing nearly all of the particulates.

Blasts of cleaning fluid can improve the cleaning performance relative to a constant flow of air. The controller in the systems disclosed here can pulse the cleaning pressure and fluid flow rate, thus potentially improving the cleaning process. Optionally, a pulsing fluid source, such as that from a positive displacement compressor, can be used to purge the material from the filter.

In one embodiment, the cleaning fluid nozzle may be mounted to a plunger attached on the translation arm.(e.g., single rotational axis, x-y, etc.). It is pushed down and held in contact with the face of the filter by a spring in the nozzle arm. The nozzles themselves may be made of a variety of materials including but not limited to an abrasion resistant plastic. These are meant to slide across the surface of the filter without damaging it, and are easily replaced when needed.

The air delivery and outlet sections may have flanges to which a number of adapter rings can be attached, thereby allowing the filters of several diameters and with various clamp designs. The DPF, which will be serviced, is mounted with the clean side of the filter facing the air delivery section so that back-flushing will occur.

In one embodiment at the start of the cleaning cycle, the cleaning nozzle is in its 'home' position, and the valve connected to the vacuum and blower is switched to the vacuum's direction. The main power relay turns on the vacuum, flow control, heater or burner (if used), and translation device. The nozzle moves through a pre-programmed set of positions, and optionally monitors the flow rate at each position (as described below).

Trial and error methods can be used to determine the duration of the cleaning cycle required to properly clean or de-ash a filter. Since filter loading is not identical for each engine, methods to automatically determine when the filter is clean are preferable.

Another embodiment of the system comprises additional items for automating the process, for improving the cleaning efficiency, and for determining when the cleaning process is complete. The cleaning fluid may be heated through in-line electrical means, combustion means, or other techniques as known in the art. A flexible coupling is attached between the heater section and a flow sensing element to absorb shock and movement. A flow sensing element monitors the flow rate of cleaning fluid to the filter face, using methods known in the art (hot wires, measurement of pressure drop across a flow restriction, etc.). By comparing the flow rates through various locations of the filter, the flow sensor can detect if the section of filter below the nozzle is more or less clogged with PM than the regions around it. Software in the electronic controller monitors and moves the nozzle to provide a relatively uniform level of cleaning. If any regions of the filter have too much pressure drop after a number of passes, the controller will call for the arm to return to that section for additional attention, and possibly higher air temperature.

An optional, but not necessary feature, can be incorporated to determine if the filter cleaning process is complete. This feature is an air blower, which is connected to the flow system behind a valve. When the first set of nozzle translation is complete, this valve is switched to direct the blower's flow into the DPF in the direction opposite to the previously applied cleaning fluid. The blower is started, and the pressure drop across the DPF is measured. This value is compared with a previously determined pressure drop for a clean filter. If the comparison is unfavorable, the cleaning procedure begins again.

Optionally, the controller can also monitor for filter failure by scanning for pressure drops which are too low (i.e., lower than that of a clean filter).

DETAILED DESCRIPTION OF THE INVENTION

Figure 1:
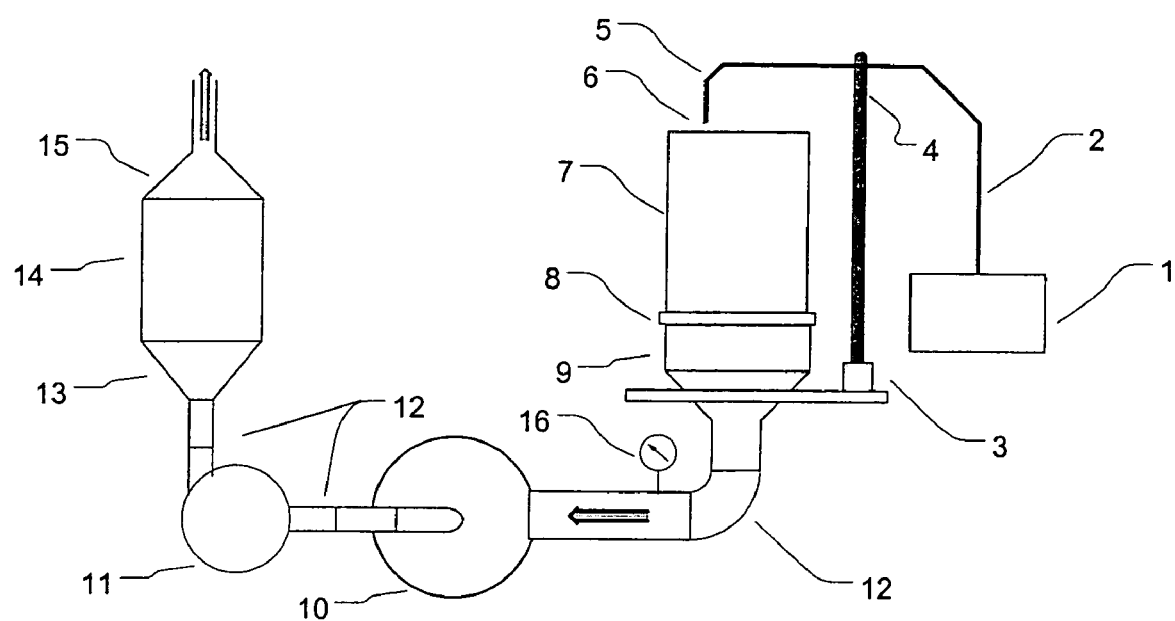
FIG. 1 shows a filter cleaning device which uses filter rotation and single-axis translation.

The present invention provides devices and methods for cleaning filters. Specifically, some embodiments of the present invention provide a system for automatically moving a cleaning fluid delivery device to clean the filter. At least some of these and other objectives described herein will be met by embodiments of the present invention.

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a nozzle" may include multiple nozzles, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings: "Optional" or "optionally" means that the subsequently described circumstance may or may not occur, so that the description includes instances where the circumstance occurs and instances where it does not. For example, if a device optionally contains a feature for a second filtering device, this means that the second filtering feature may or may not be present, and, thus, the description includes structures wherein a device possesses the second filtering feature and structures wherein the second filtering feature is not present.

The foundation of the filter cleaning systems is similar for all the disclosed methods of fluid delivery. In one embodiment, a flexible duct 2 is connected to a source of high pressure fluid 1 (air or other cleaning fluid such as water, alcohol, acetone when appropriate). The fluid is transferred through an arm 5 which is attached to means for translation 4, eventually exiting the duct at a nozzle 6. A controller moves the nozzle to provide a relatively uniform level of cleaning for all parts of the filter. In this embodiment, the base of the filter 7 is attached to a sealing flange 8 and an adapter base 9. The ducting 12 which carries the cleaning fluid and material released from the DPF through a filtering device 10, a suction device 11, means to change the flow area 13, and optionally a second filtering device 14. Finally, the cleaned gas is passed through an exit cone 15 and emitted. A vacuum gauge 16 may be used to monitor the level of suction provided by the suction device and thus monitor the progress of the cleaning operation.

Optionally, the adapter base 9 may contain an electrical heating element and supplementary air supply. When the heating element and the air supply are energized, a flow of hot air passes through the DPF and oxidizes the carbonaceous material in the DPF. This process would occur before the use of high pressure fluid as a means to reduce the amount of particulate within the DPF, and thus reduce the amount which must be captured by the collection system.

The design of the collection system downstream of the DPF may be given special consideration because diesel particulate matter contains ultrafine particles. In general, diesel PM is an agglomeration of particles which exist in several size classes ("modes"). The so-called nuclei mode has a diameters ranging between about 10 and 20 nm, while the so-called accumulation mode has diameters ranging between 100 and 200 nm. Widely available HEPA filters are rated to trap 99.97% of airborne particles 300 nanometers and larger. The next, and far more expensive, grade is the ULPA filter (Ultra-Low Penetration Air). This class of filters traps finer particles: 99.99% of particles 120 nanometers and larger. It is unclear whether such filters will remove a sufficient quantity of particles emitted by the cleaning device. Mechanisms such as agglomeration and filtering by the particle layer might remove particles that would normally pass through the HEPA or ULPA filter, but the extent of this is unknown.

Figure 4:
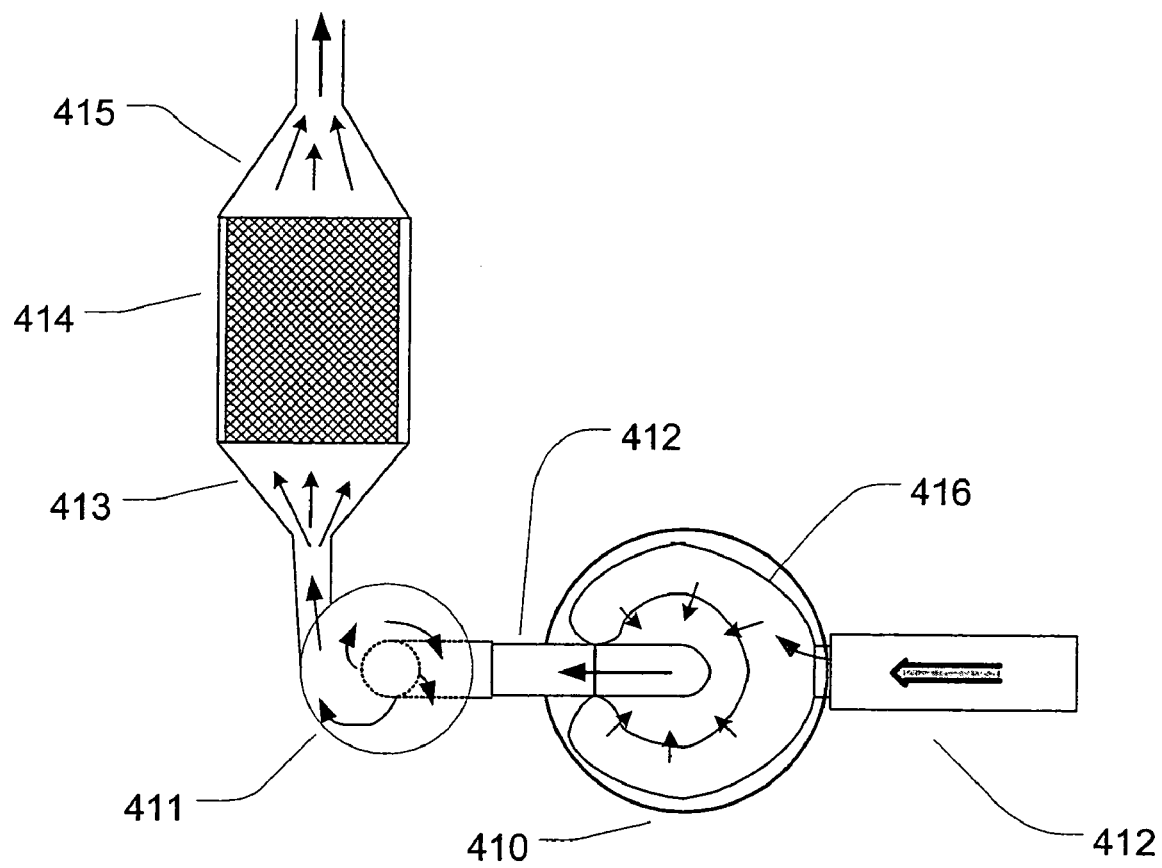
FIG. 4 shows the exit portion of the cleaning machine with multiple stage filtration.
Figure 9:
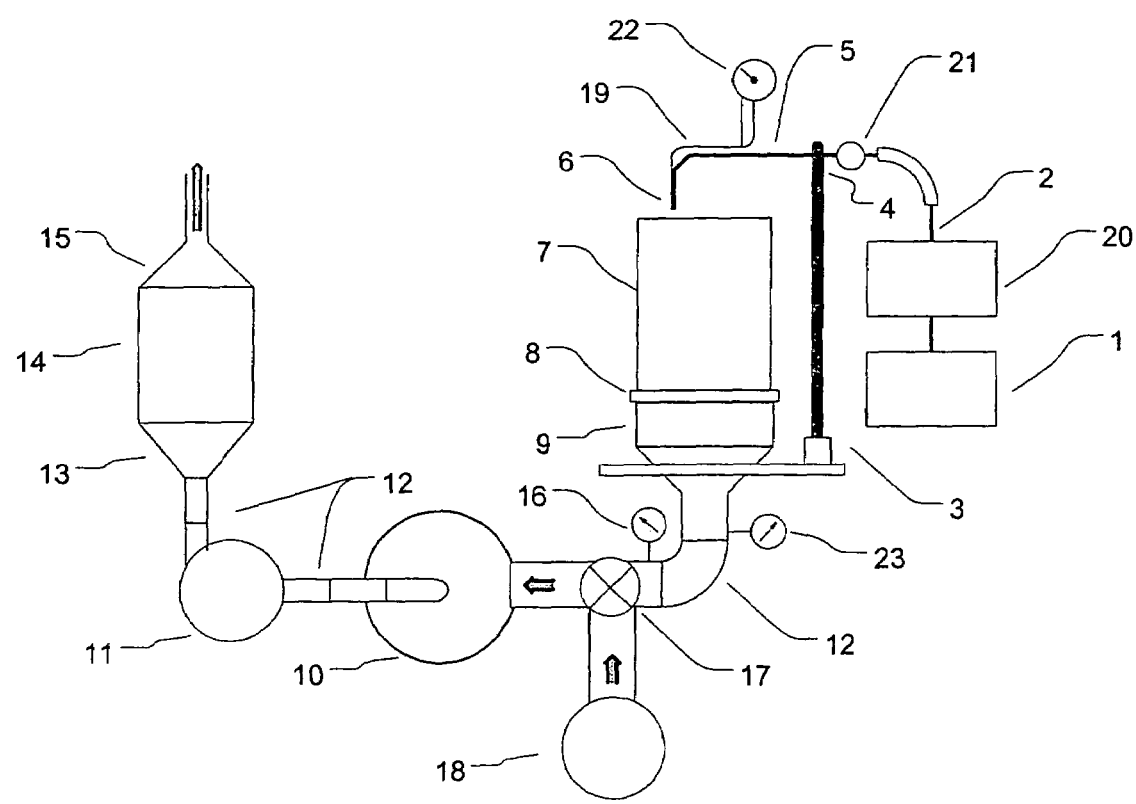
FIG. 9 shows a DPF cleaning system with process diagnostics and reverse-flow mode.

An optional improvement is to install a DPF in the exhaust stack of the vacuum system. Since a DPF is capable of filtering nearly all of the particulates larger than about 10 nm diameter [*Effectiveness of Particulate Traps on Construction Site Engines: VERT Final Measurements*, A. Mayer (TTM), U. Matter (ETHZ), J. Czerwinski (AFHB), N. Heeb (EMPA), DieselNet Technical Report, www.dieselnet.com], a near-complete sequestration of particulate is possible. FIG. 1, FIG. 4 and FIG. 9 illustrate this design. The equipment (FIG. 4) downstream of the DPF being cleaned consists of tubing to direct the air flow 412, a canister 410 lined with a HEPA or ULPA filter bag 416, an air blower 411 to provide suction, additional ducting to change the flow area 413, a diesel particulate filter 414, and finally another area changing device 415. Particulate-laden air flows through a filter bag 416, thus depositing most of the particulate matter into the bag. The ultrafine particulate that passes through the filter bag is caught in the walls of the DPF 414 and the subsequently formed particulate layer. Preferably, this DPF is not coated with catalytic material so that it can be washed with water or solvent without risk of damage. Preferably, this DPF already has a layer of particulate deposited on it to improve the filtering efficiency.

The above embodiment of the second filtration stage can be implemented on any of the cleaning machines described herein. It may also be implemented in the systems which have both a blower and vacuum (separated by a valve) at one end of the flow path (see FIG. 9).

In the next few paragraphs, methods for translating the fluid nozzle across the filter face or other surface of the filter will be described.

Figure 2:
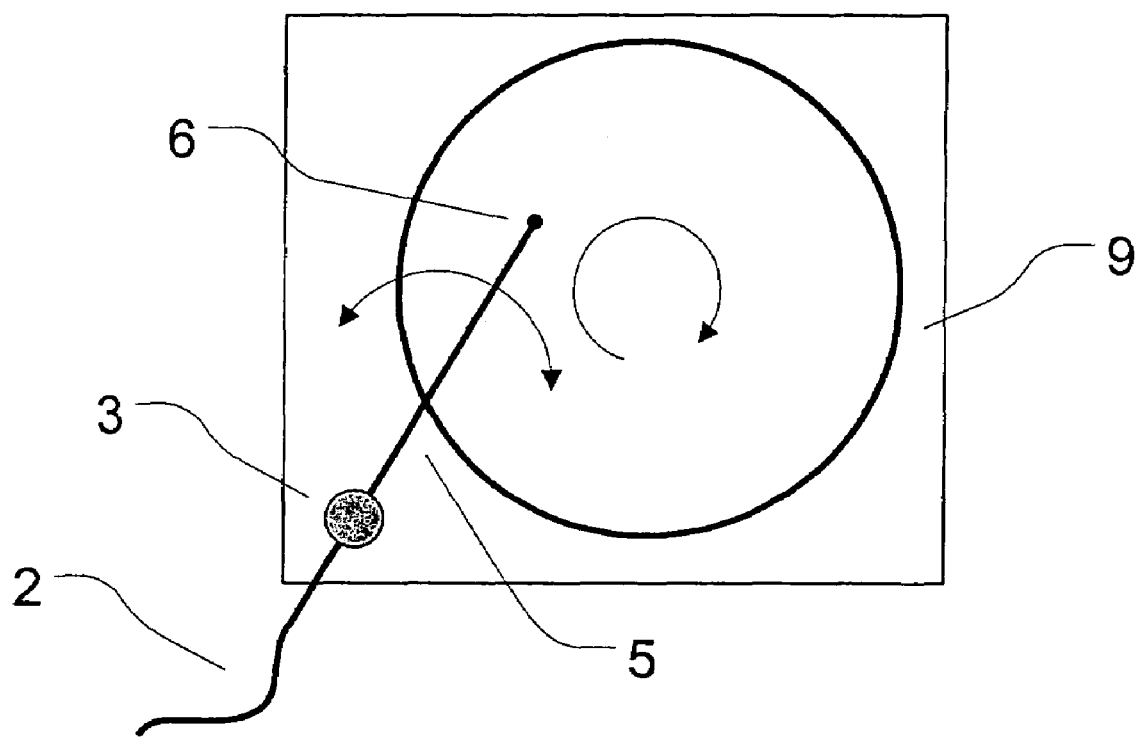
FIG. 2 shows the details of the nozzle translation (in which one motor causes the nozzle arm to rotate across the filter face, and another motor rotates the filter during cleaning).

The first embodiment of the invention is directed to the feature of filter rotation and arc-like jet motion. High pressure cleaning fluid is obtained from a source 1 and transferred through ducting 2. The filter cleaner uses a turntable 9 and swing arm 5 with an air nozzle 6 to direct high pressure cleaning fluid to the filter face. A schematic of the overall system is shown in FIG. 1, and the nozzle translation device is detailed in FIG. 2. In FIG. 2, the filter cleaner may optionally have one or two motors. A one motor system will have a single motor 3 which can be used in combination with reduction gears (not shown) to control both the arm 5 and turntable 9 movement. A two motor system will have independent motors for the nozzle arm 5 and the filter turntable 9. In a typical cleaning procedure, the filter 7 is attached to the rotation table with an adapter ring 8 and is locked in the starting position. When the start button is depressed, the main power relay activates, and in turn activates the flow of fluid, the drive motor, and the suction device 11. The swing arm rotates, moving the air nozzle across the face of the filter from the outer diameter to the center while the turntable rotates the filter. This causes the nozzle to trace a spiral path on the face of the filter. The swing arm is attached to the potentiometer of a DC motor speed controller, which increases the RPM of the drive motor as the air nozzle moves across the filter in an to attempt to maintain a constant surface feed rate along the spiral path. When the air nozzle reaches the center of the filter, a limit switch is engaged which deactivates the main power relay that then in turn de-energizes the solenoid, motor, and vacuum. There is also an off button that has the same effect as the limit switch that can be used at any point of operation. After the filter has gone through this cycle, the swing arm is unlocked and swung out of the way. At this point, the cycle can be repeated with the same filter to allow multiple passes, or the process can be started on another filter.

Figure 3:
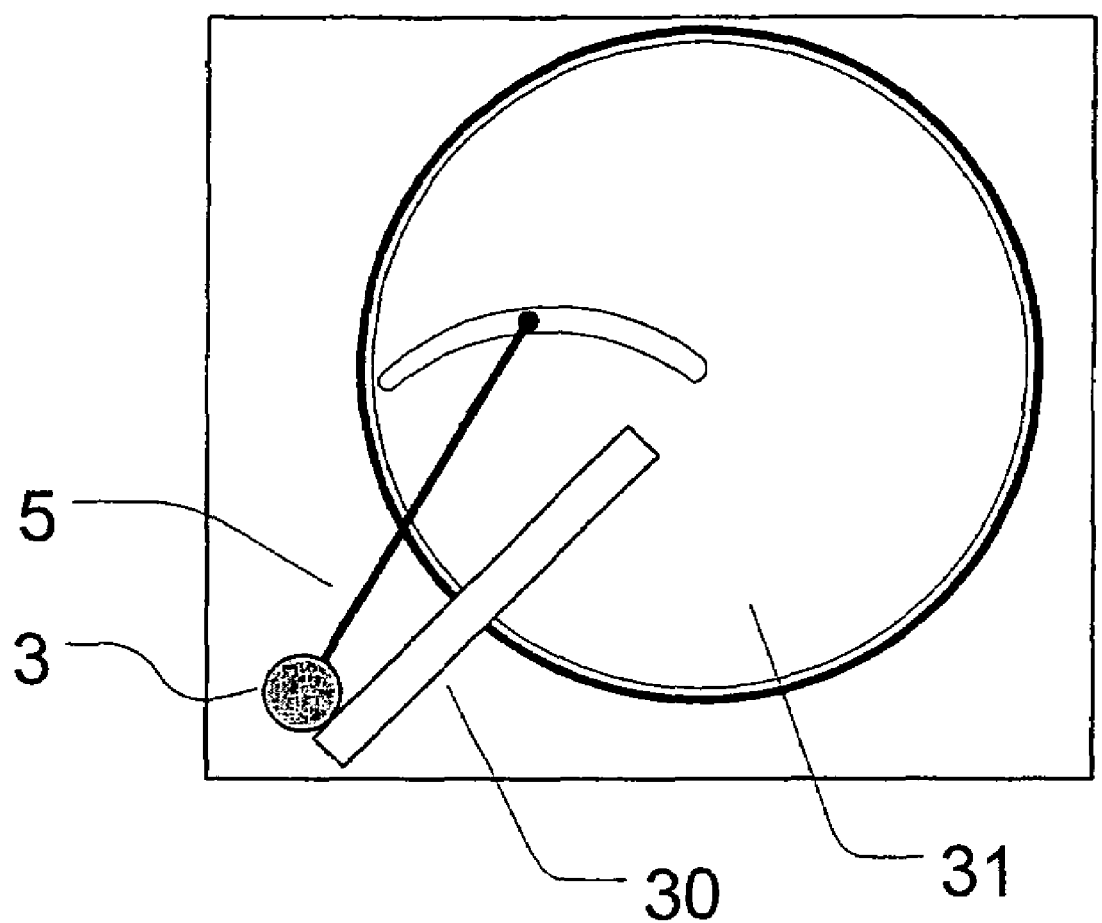
FIG. 3 shows the nozzle translation unit with a suction mask in place.

The unit efficiency can be improved by use of a 'mask' 31 which covers the face of the DPF. FIG. 3 shows the translation unit with such a mask in place. The mask increases the flow of air through the uncovered section by focusing the suction force on a small area, thus concentrating the suction near the region that is being treated with compressed air. The mask is essentially a disk from which an arc has been cut, with an outer diameter equivalent to the inner diameter of-the filter flange. It may be made of any suitably rigid material, such as plexiglass, stainless steel, or aluminum. Although the arc may be of any thickness, for optimal performance the arc should be slightly larger than the outside diameter of the nozzle. The mask 31 has an bracket 30 attached to it so that as the filter and arm rotate, the mask is held in a relatively fixed position. The suction from the vacuum provides a force to hold the mask to the face of the DPF.

Figure 5:
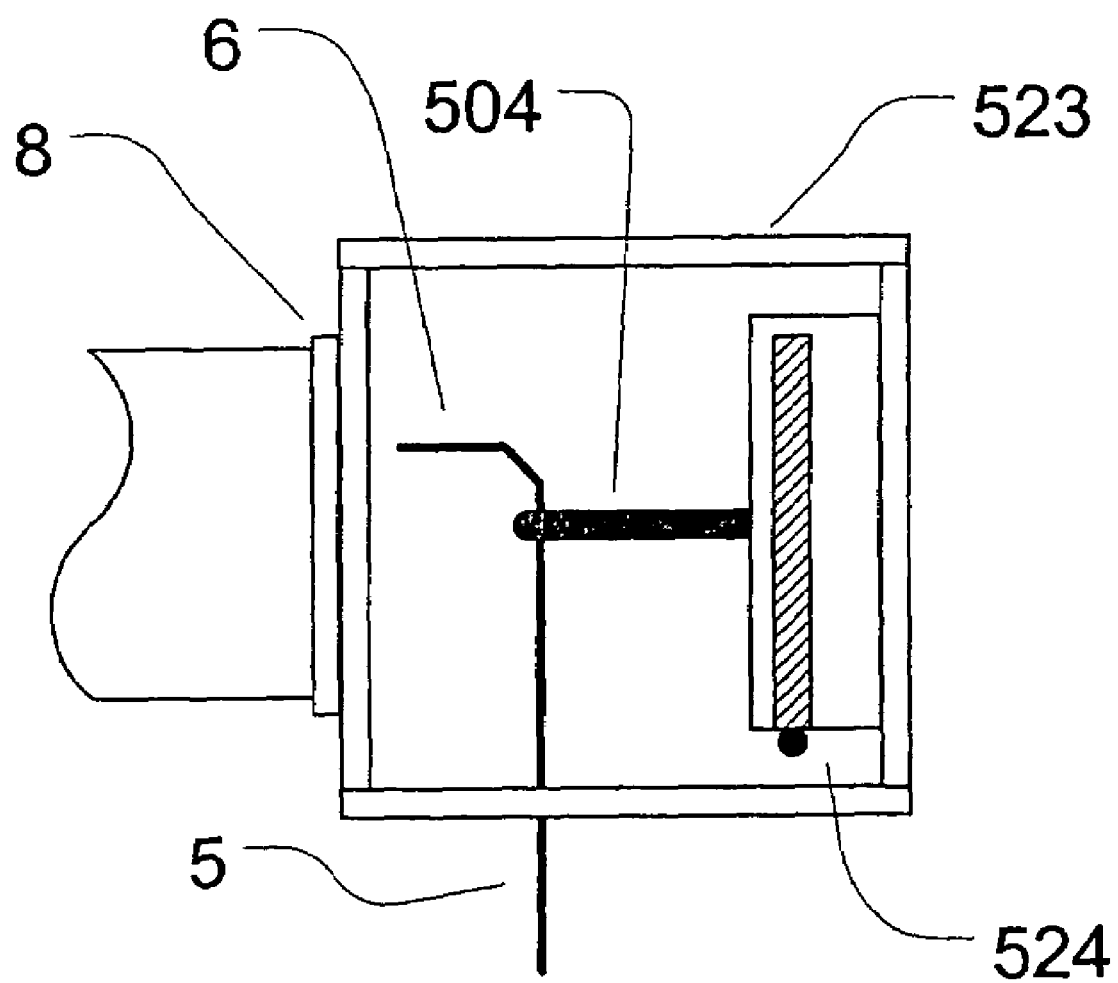
FIG. 5 shows a filter cleaning device which uses x-y translation.
Figure 6:
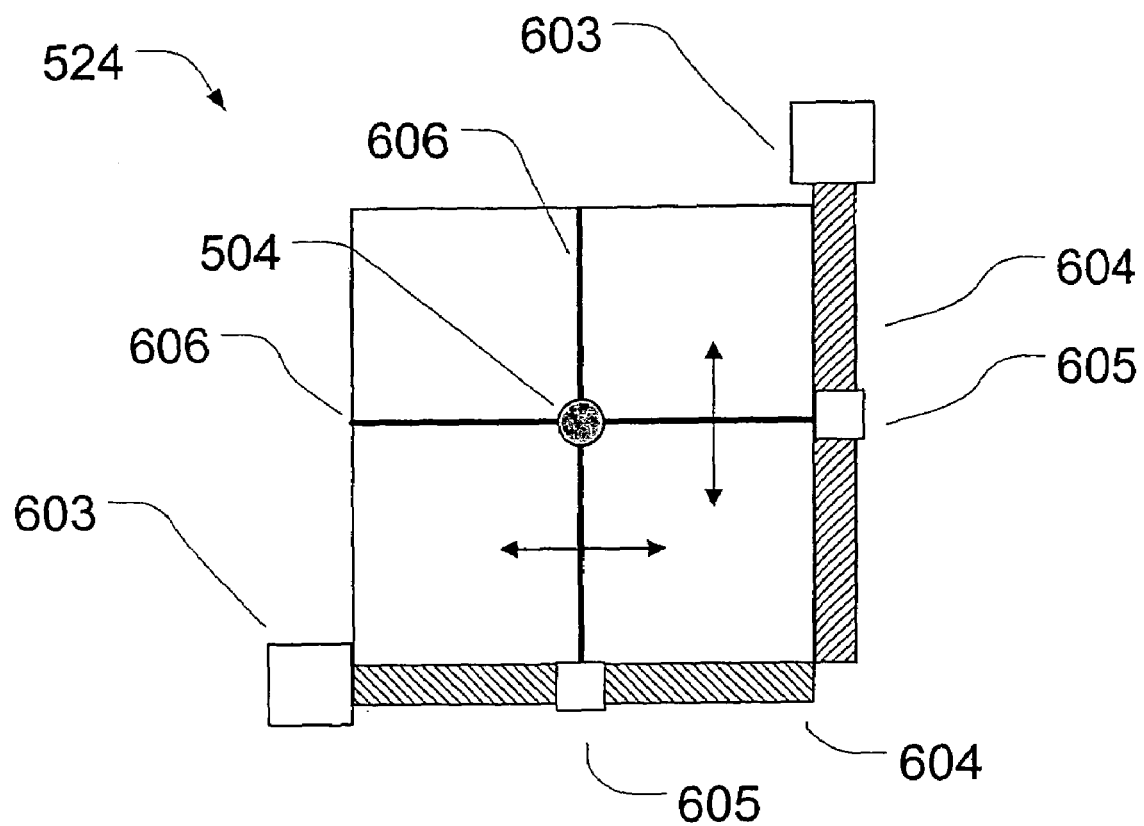
FIG. 6 shows a nozzle motion unit which translates in the x and y directions.

The second embodiment of the invention is directed to the x-y translation. This embodiment is a different means of delivering the fluid to the filter face, and a different way of moving the nozzle across the face, and is shown in FIG. 5 and FIG. 6. This embodiment has a cleaning nozzle which translates across the filter face in x-y directions, i.e., two perpendicular axes. Many means for x-y translation are used in industry, and the method given here serves as an illustrative, nonlimiting example; many of the currently-used x-y translation methods could also be used. A frame 523 connects the translator 524 with the DPF mounting bracket 8. A rigid arm 504 connects the translator 524 with the fluid duct 5. Another view of the translator is shown in FIG. 6. The rigid arm 504 is attached to two bars 606 with provision for sliding in both directions. The bars 606 are connected to carriers 605, which are mounted on screws 604. The screws are turned by motors 603 to cause the carriers 605 to move in the desired direction and at the desired rate. The basic operation of the machine is similar to the first embodiment and basic design.

Figure 7:
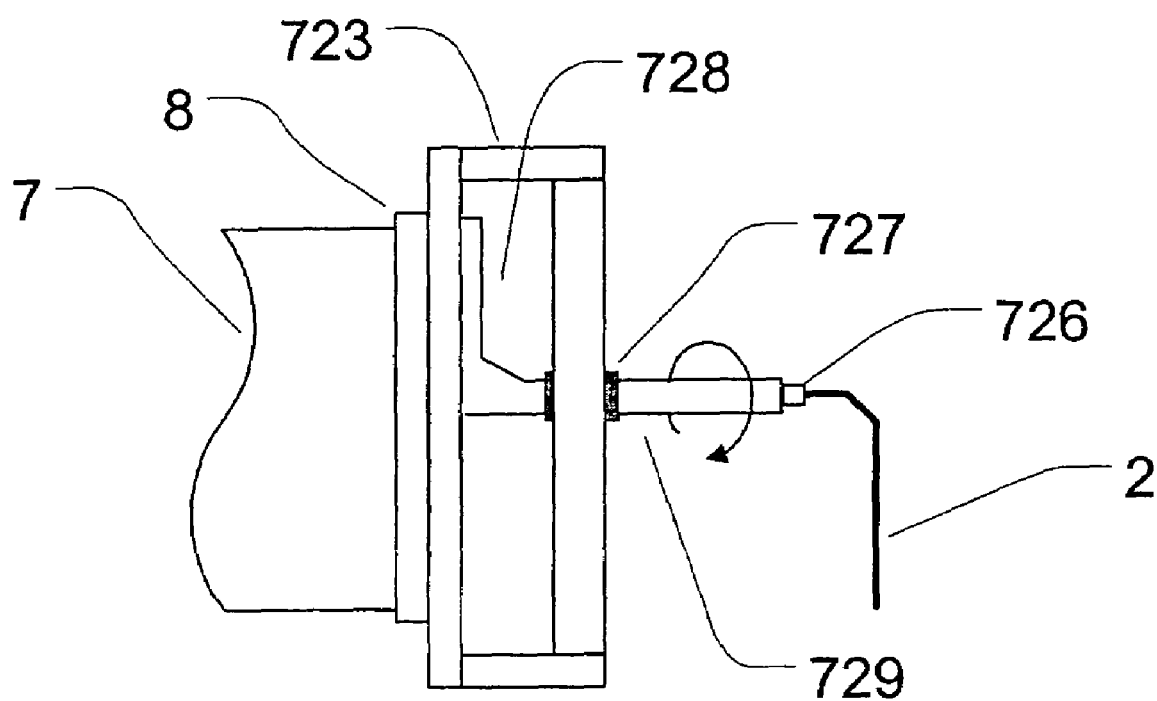
FIG. 7 shows a filter cleaning device which uses nozzle arm rotation.
Figure 8:
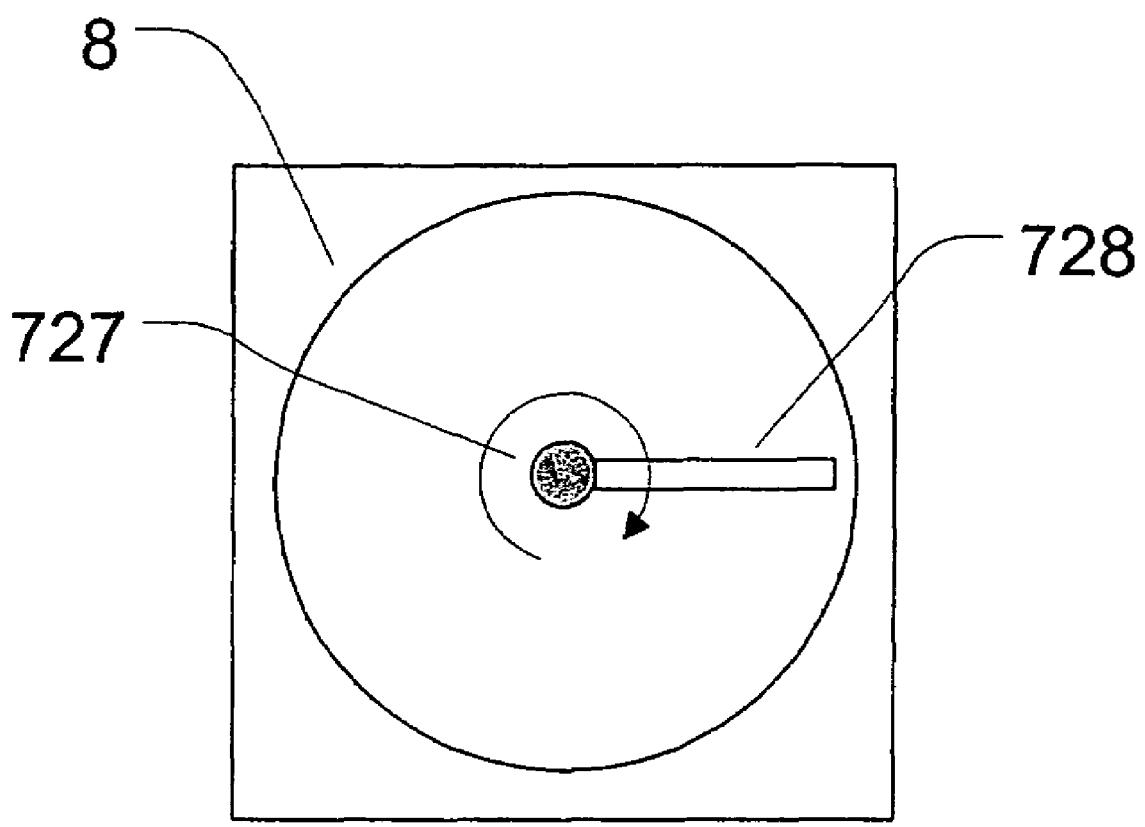
FIG. 8 shows a filter motion control unit in which the nozzle arm rotates about the central axis of the filter.

The third embodiment of the invention is directed to a rotating arm. This embodiment is illustrated in FIG. 7 and FIG. 8. The nozzle 728 and delivery tube 729 are attached to the cleaning fluid source 2 with a standard commercial rotating coupling 726 (available from most industrial suppliers). A suitable bearing 727 attaches the delivery tube 729 to the frame 723. The frame is attached to the flanged-connection 8, which then attaches to the DPF 7. During a cleaning cycle, the nozzle 728 rotates about the central axis of the filter, thus periodically exposing a narrow strip of the filter to cleaning fluid.

Another embodiment of the system comprises additional items for automating the process, for improving the cleaning efficiency, and for determining when the cleaning process is complete (FIG. 9). The cleaning fluid is be heated through in-line electrical or combustion means 22. Heating may aid particulate removal by volatilizing part of the particulate, and decreasing the viscosity of any liquid or low melting point material in the particulate. A flexible duct 2 is attached between the heater section and a flow sensing element 21 to absorb shock and movement. A flow sensing element 21 monitors the flow rate of cleaning fluid to the filter face, using methods known in the art (hot wires, measurement of pressure drop across a flow restriction, etc.). By comparing the flow rates through various locations of the filter, the flow sensor can detect if the section of filter below the nozzle is more or less clogged with PM than the regions around it.

Software in the electronic controller monitors and moves the nozzle 6 by any of the means disclosed above. If any regions of the filter have too much pressure drop after a number of passes, the controller will call for the arm to return to that section for additional high pressure fluid, and possibly repeat the exposure with the fluid at higher temperature.

An optional, but not necessary, set of components can be incorporated to determine if the filter cleaning process is complete. This feature is an additional air blower 18, which is connected to the flow system behind a valve 17. When the first nozzle translation process is complete, this valve is switched to direct the flow of blower 18 into the DPF in the direction opposite to the previously applied cleaning fluid. At the same time, the suction device 11 may be turned off. This is called reverse-flow mode. When the blower 18 is started, the pressure drop across the DPF is measured using the pressure sensor 23. This value is compared with a previously determined pressure drop for a clean filter. If the comparison is unfavorable, the cleaning procedure may begin again. Optionally, the controller can also monitor for filter failure by scanning for pressure drops which are too low (i.e., lower than that of a clean filter). Note that the original blower 11 could be used for this purpose with suitable ducting and valving.

An optional pitot tube 19 (FIG. 9) is mounted in the proximity of the cleaning nozzle, and is used when the device is operating in reverse-flow mode. The pressure sensor 22 mounted on the pitot tube indirectly measures the velocity of the fluid that passes through the filter section below the nozzle 6. While the optional reverse-flow blower is on, a translation sweep by the arm can be performed to validate that each of the regions of the filter are suitably clean.

The cleaning device described in this application has many unique features. For example, the device automatically changes the region onto which high pressure fluid is directed. Secondly, the device may use a small-sized air jet which moves across the surface of the filter. Thirdly, the device may use a flow sensing device to identify regions of the filter which will require additional cleaning. In addition, the device may use a combination of a vacuum and blower to determine when cleaning is complete. Furthermore, the device may use adapters to allow cleaning of various filter diameters and clamp styles. Furthermore, the nozzle tip in the device is easily replaceable and made of non-abrasive material, such that it may be in constant contact with the filter face, thus reducing losses of air pressure.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All publications, patents, and patent publications listed in this application are fully incorporated herein by reference for all purposes. All such modifications are intended to be within the scope of the claims appended hereto.

What is claimed is:

1. An apparatus for cleaning a generally cylindrical diesel engine particulate filter having a central axis extending in a normal axial exhaust flow direction between a first axial face and a second axial face, the apparatus comprising:
    a base adapted to support one of the axial faces of the diesel particulate filter;
    a cleaning fluid delivery device for providing a cleaning fluid to at least a portion of the other axial face of the diesel particulate filter;
    at least one actuator cooperating with at least one of the base and cleaning fluid delivery device;
    a controller with logic for instructing said actuator to automatically move at least a portion of the cleaning fluid delivery device relative to the base along a path across a surface of the diesel particulate filter to spray the cleaning fluid onto the filter; and
    a collector cooperating with the support base positioned to receive waste material released from the filter during a filter cleaning event.

2. The device of claim 1 wherein said cleaning fluid delivery device includes a nozzle that can translate across the surface of said diesel particulate filter in two axes which are perpendicular to one another and the central axis.

3. The device of claim 1 wherein said cleaning fluid delivery device includes a nozzle that moves across the surface of the diesel particulate filter along a path selected from one of the following: a rotational path, a curved path, or a spiral path.

4. The apparatus of claim 1 wherein said path is a predetermined path.

5. The apparatus of claim 1 wherein the cleaning fluid delivery device comprises a nozzle coupled to an arm that is moved by said actuator that guides the nozzle across the surface of the diesel particulate filter.

6. The apparatus of claim 1 wherein the cleaning fluid delivery device comprises flexible duct coupled to a source of high pressure fluid.

7. The apparatus of claim 1 wherein the cleaning fluid delivery device comprises means for delivering fluid to the diesel particulate filter.

8. The apparatus of claim 1 wherein the cleaning fluid delivery device is moved along a path to provide a substantially uniform level of cleaning of said surface of the diesel particulate filter.

9. The apparatus of claim 1 wherein said collector comprises ducting which carries cleaning fluid and material released from the diesel particulate filter through a filtering device and a suction device.

10. The apparatus of claim 9 wherein said filtering device is selected from one of the following: a HEPA filter or a ULPA filter.

11. The apparatus of claim 1 wherein said filtering device is selected from one of the following: a HEPA filter or a ULPA filter.

12. The apparatus of claim 1 wherein said controller can pulse the cleaning pressure and fluid flow rate from the delivery device.

13. The apparatus of claim 1 wherein said fluid delivery device is coupled to a pulsing fluid source for pulsing the cleaning pressure and fluid flow rate from the delivery device.

14. The apparatus of claim 1 wherein the controller automatically determines when to stop a cleaning event.

15. The apparatus of claim 1 further comprising a heating device for heating cleaning fluid prior to use on the diesel particulate filter.

16. The apparatus of claim 1 further comprising a fluid flow sensor positioned to determine if a section of diesel particulate filter below the nozzle is more or less clogged with particulate mater than regions of the diesel particulate filter around the section.

17. An apparatus for cleaning a generally cylindrical diesel engine particulate filter having a central axis extending in a normal axial flow direction between a first axial face and a second axial face, the apparatus comprising:
- a base adapted to support the first axial face of the diesel particulate filter with the central axis in a generally vertical orientation;
- a cleaning fluid delivery device for providing a cleaning fluid to limited a portion of the second axial face of the diesel particulate filter;
- at least one actuator cooperating with at least one of the base and cleaning fluid delivery device;
- a controller with logic for instructing said actuator to automatically move at least a portion of the cleaning fluid delivery device relative to the base along a path extending across a surface of the diesel particulate filter to spray the cleaning fluid onto the filter; and
- a collector cooperating with the support base positioned to receive waste material released from the filter during a filter cleaning event.

18. The apparatus of claim 17 wherein said cleaning fluid delivery device includes a nozzle that can translate across the axial face of said diesel particulate filter in two axes which are perpendicular to one another and the central axis.

19. The apparatus of claim 17 wherein base is rotatable and driven by the at least one actuator.

20. The apparatus of claim 17 further comprising a vacuum device coupled to the collector to draw cleaning fluid and waste material from the diesel particulate filter into the collector.

* * * * *